United States Patent [19]

Raith

[11] Patent Number: 5,235,632
[45] Date of Patent: Aug. 10, 1993

[54] MOBILE TELEPHONY SYSTEM INTENDED FOR INDOOR AND OUTDOOR SUBSCRIBER USE

[75] Inventor: Alex K. Raith, Kista, Sweden

[73] Assignee: Telefonaktiebolaget L M Ericsson, Stockholm, Sweden

[21] Appl. No.: 680,508

[22] Filed: Apr. 4, 1991

[30] Foreign Application Priority Data

Apr. 10, 1990 [SE] Sweden .................. 9001312

[51] Int. Cl.$^5$ .......................................... H04M 11/00
[52] U.S. Cl. ...................... 379/59; 455/33.1; 455/33.4; 379/58
[58] Field of Search ................... 379/58–61, 379/63; 455/33.1, 33.2, 33.3, 33.4, 34.1, 34.2

[56] References Cited

U.S. PATENT DOCUMENTS

| | | |
|---|---|---|
| 4,748,655 | 5/1988 | Thrower et al. |
| 4,771,448 | 9/1988 | Koohgoli et al. ............... 379/59 |
| 4,790,000 | 12/1988 | Kinoshita . |
| 4,980,907 | 12/1990 | Raith et al. ................... 379/61 |
| 4,989,230 | 1/1991 | Gillig et al. ................... 379/61 |
| 5,036,531 | 7/1991 | Spear ............................ 379/59 |

FOREIGN PATENT DOCUMENTS 0344989 12/1989 European Pat. Off. ........... 379/59

OTHER PUBLICATIONS

IEE Proceedings, vol. 133, No. 6: "New Channel Assignment Strategy in Cellular Mobile Radio Communication Systems", Apr. 1986, Arazi.

Ericsson Review, No. 1, vol. 67: "The Future of Cellular Telephony", 1990, Jansson et al.

Primary Examiner—Curtis Kuntz
Assistant Examiner—Dwayne D. Bost
Attorney, Agent, or Firm—Burns, Doane, Swecker & Mathis

[57] ABSTRACT

A mobile telephony system includes an internal part-system, which is installed in a building and an external part-system. The internal part-system has internal base stations which are connected to a mobile switching center, to which external base stations are also connected. The mobile telephony system is assigned a frequency band which comprises a plurality of channels. The external part-system is divided into cells and has fixed channel assignment with a few channels to each external base stations. The internal part-system is adaptive and the internal base stations have access to all channels of the system. In order to determine whether a mobile station belongs to the internal or to the external part-system, an internal identification word is transmitted from the internal base stations and an external identification word is transmitted from the external base stations. When the signal strength of the internal identification word exceeds a threshold value, the mobile station transmits an internal identification word to the internal base stations. If the signal strength falls beneath this threshold value, the mobile station identifies itself to the external part-system.

8 Claims, 3 Drawing Sheets

MOBILE TELEPHONY SYSTEM INTENDED FOR INDOOR AND OUTDOOR SUBSCRIBER USE

TECHNICAL FIELD

The present invention pertains to a mobile telephony system intended for indoor and outdoor subscriber use and comprising an external part-system for outdoor use which includes base stations of relatively high signal-strength and connected directly to a mobile switching centre, and an internal part-system for indoor use and having internal base stations of relatively low signal strength which are connected to the mobile switching centre.

BACKGROUND ART

A known mobile telephony system includes geographic cells, each having a respective base station and being connected to a switching centre. Each base station has access to a given number of channels, which may be both frequency shared and time shared. The cells are collected in large cell groups, in which adjacent cells are assigned separate frequencies, so-called fixed channel assignment. All frequencies of the system are found within a cell group. Several cell groups are placed adjacent one another, in order to cover wide geographic regions and the frequency assignment in the cells is selected so that mutually separate groups will not disturb one another. A detailed description of the aforesaid system is found in CMS 88, Cellular Mobile Telephone System, Ericsson Telecom AB, 1988. Adaptive mobile telephony systems are also known, in which each base station has access to all system channels. A mobile subscriber is assigned a channel subsequent to measuring occurrent disturbances, so-called dynamic channel assignment. A system of this kind is intended for external use, normally by vehicular subscribers. Both the base station and the subscriber mobile station has a relatively high transmission power. Corresponding mobile telephony systems are known for indoor use, for instance in factories or offices, for instance as described in the 39th IEEE Vehicular Technology Conference, Volume 1, May 1-3, 1989, Dag Åkerberg: "Properties of a TDMA Pico Cellular Office Communication System". This report describes an adaptive telephony system comprising cordless, portable subscriber apparatuses which can be connected to a subscriber exchange through base stations. One requirement is that such indoor systems shall have a large connection coupling capacity. Accordingly, the system has a relatively large number of small cells each with a respective base station, and both the base stations and the portable subscriber apparatuses have a relatively low signal strength. This enables the same channels to be utilized repeatedly within a building without the occurrence of troublesome disturbances.

One problem encountered in mobile telephony is to offer the subscribers a sufficiently large number of channels within a limited frequency range. This frequency range is assigned by the authorities and may not be exceeded such that adjoining frequency ranges will be disturbed. Frequency time-sharing enables the number of channels within a frequency range to be increased considerably, although the number of channels remains restricted. Consequently, it is difficult to have an indoor system and an outdoor system for mobile telephony of large capacity within the same geographical region. Particular difficulties are found in introducing an indoor system in a region in which an outdoor system has already been established. It is also difficult for a subscriber to utilize both systems with one and the same mobile station.

DISCLOSURE OF THE INVENTION

The aforesaid problems are solved in accordance with the invention by means of a combination of an outdoor system and an indoor system where both systems have access to substantially the whole of the assigned frequency range. The indoor system has adaptive channel assignment and relatively low signal strength. A subscriber mobile station is able to distinguish a base station in the outdoor system from a base station in the indoor system and to make a selection between these base stations. The mobile station can identify itself to the selected base station.

The invention is characterized by the features set forth in the following Claims.

BRIEF DESCRIPTION OF THE DRAWINGS

An exemplifying embodiment of the invention will now be described in more detail with reference to accompanying drawings, in which.

BEST MODES OF CARRYING OUT THE INVENTION

Figure 1:
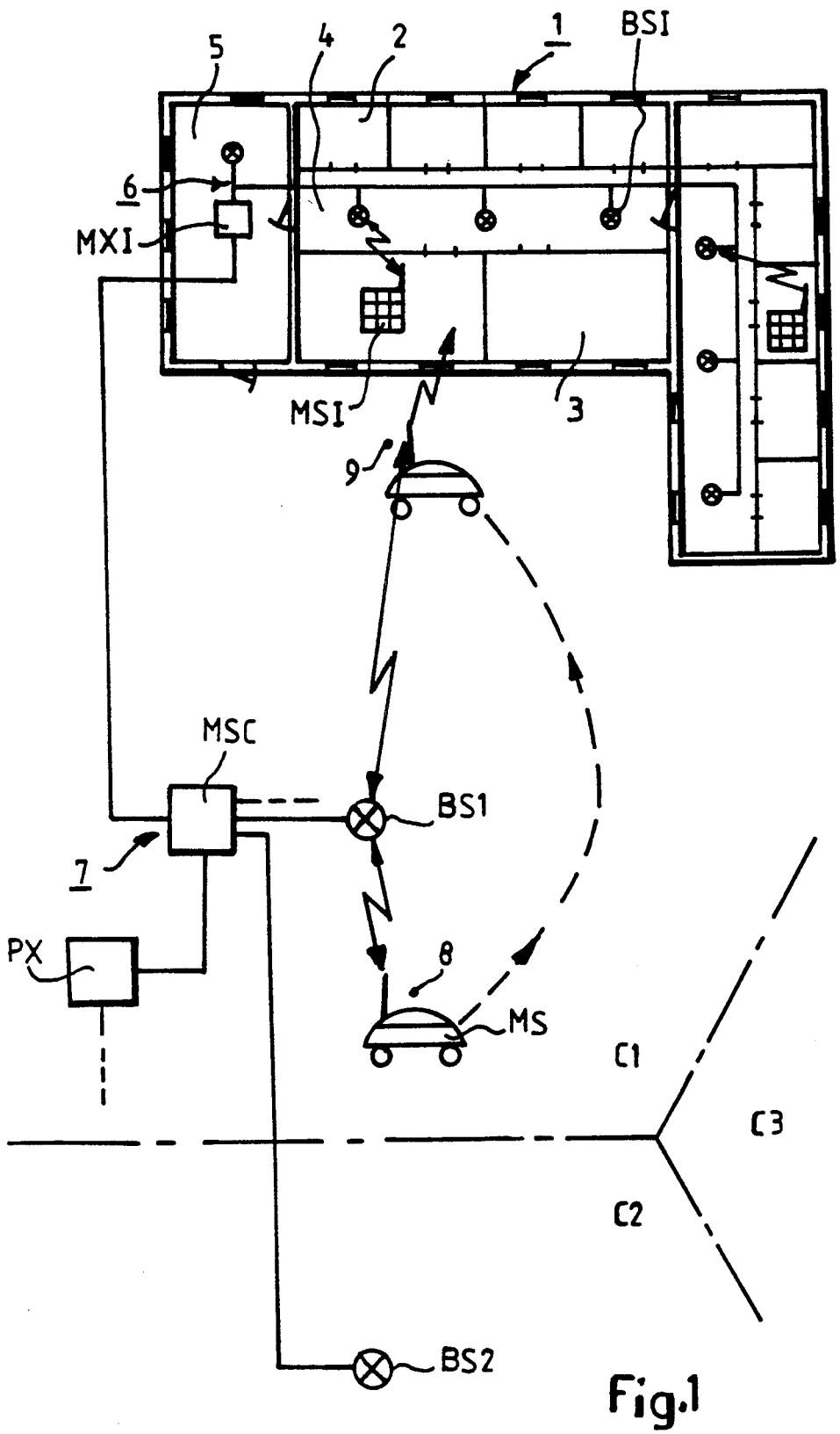
FIG. 1 illustrates an internal mobile telephony system incorporated in a building which lies in the region of an external mobile telephony system.

FIG. 1 illustrates a building 1 which includes offices 2, laboratory locations 3, corridors 4 and an entrance hall 5. The building is equipped with a system 6 of cordless telephones which form an internal part-system of a mobile telephony system. This mobile telephony system includes an external part-system 7, which is a cell-divided mobile telephony system. The internal part-system includes in the corridors 4 internal base stations BSI which are connected to an internal switching centre MXI, by means of cables 8. This switching center is connected to an external mobile switching center MSC, which is connected to a subscriber exchange PX in the public telephone network. Each internal base station covers an area within the building 1, this area normally being referred to as a microcell. The external part-system 7 is divided into cells C1, C2 and C3, illustrated schematically in the Figure, and a base station, BS1 and BS2 is located in each cell. These base stations are connected to the external mobile switching center MSC and the external part-system has so-called fixed channel assignment. The whole of the external part-system has access to a mobile telephony frequency band, which is divided into a number of two-directional channels. Each cell has access to solely a part of these channels and the channels are distributed between the cells in a manner which will prevent adjacent cells from disturbing one another. One of the channels in each cell is a control channel which is used, for instance, to establish connections and to change channels, so-called handover. The external part-system is described in more detail in the aforesaid reference CMS 88.

The internal part-system 6 also has access to a frequency band which is divided into a number of two-way channels. One of the channels in this system is also chosen as a control channel. An office normally requires a telephone system of large capacity. It must be possible for many users MSI within the limited area of the building 1 to obtain a connection simultaneously, without disturbing one another, and it must be possible for the consumers to move freely within the building while constantly being connected to one of the base stations BSI. Consequently, all of the base stations BSI of the internal part-system have access to all channels and the channel assignment is adaptive. In addition to the desired high capacity, this adaptive system also affords advantages from the aspect of installation. An adaptive cordless telephony system for indoor use is described in more detail in the aforesaid reference IEEE Vehicular Technology Conference.

The assignment of a frequency band for mobile telephony, for instance, is given by the appropriate authority. The frequency range available is divided into frequency bands which are assigned to the users. It is important that the users do not encroach on one another frequency bands, so that a mobile radio system will not interfere with an aircraft landing system, for instance. The available frequency range is limited and the number of users is large and it is imperative that each user will utilize his limited frequency band effectively. In order to enable frequencies to be utilized effectively, both the internal part-system 6 and the external part-system 7 have access to the same frequency band.

Obviously, there is a risk that the internal part-system 6 and the external part-system 7 will interfere with one another. The mobile user MSI in the internal part-system is connected with one of his base stations BSI on a channel of determined frequency. A vehicular user MS located in a position 8 in the external part-system 7 establishes connection with his base station BS1 on the same channel. The transmission powers of the internal part-system are very small compared with the transmission powers of the external part-system and the risk of the connection to MS being disturbed by the internal part-system is small. On the other hand, the connection to the internal mobile station MSI can be disturbed by the established outdoor connection, and this risk is relatively high when the vehicular mobile station MS moves to a position 9 in the vicinity of the building 1. This disturbance is detected by the internal part-system and the disturbed channel in the internal part-system 6 is deactivated or disconnected and a non-disturbed channel is connected. Because the internal part-system is adaptive and all of the internal base stations BS1 have access to all channels, the probability of all channels being occupied or disturbed is very small, so that there is nothing to prevent the connection of this new channel.

It is important that the mobile station MSI can determine whether it belongs to the internal part-system 6 or to the external part-system 7. It is necessary that a mobile station MSI is able to determine its status in this respect when a subscriber wishes to be able to call another subscriber or wishes to be called by some other subscriber. The signals of the external part-system 7 are so strong that said signals will often reach into the building 1, therewith enabling a conversation to be carried out indoors via the base station BS1 of the external part-system. The signals of the internal part-system, on the other hand, are weak and it is often impossible to carry out an outdoor conversation via the internal base stations BSI. Consequently, when the subscriber is outdoors, it is necessary to establish a connection via the external base statiaon BSI. When the subscriber is indoors, it is often advantageous to establish a call via the internal base stations BSI, among other things because of channel availability and also for cost reasons. An advantage is therefore also afforded when each of the internal base stations BSI220 has access to all channels of the system, so that the risk of a call not being connected will be small.

The control channels in the respective part-systems are used to determine whether the mobile stations MSI belong to the internal or the external part-system. The control channel is composed of a channel from the base station to the mobile station, often referred to as FOCC (Forward Control Channel) and a channel from the mobile to the base station, often referred to as RECC (Reverse Control Channel). The mobile station MSI listens constantly on FOCC, so as to be prepared to receive a call. When the mobile hears FOCC for the first time, the mobile transmits a signal with the intention of revealing its identity to the base station, so-called logging-in. This enables the mobile switching center MSC to connect the call to the correct base station. A more detailed description of the control channel of a digital mobile telephony system is found, for instance, in the aforesaid reference CMS 88, Chapter 3.

Figure 2:
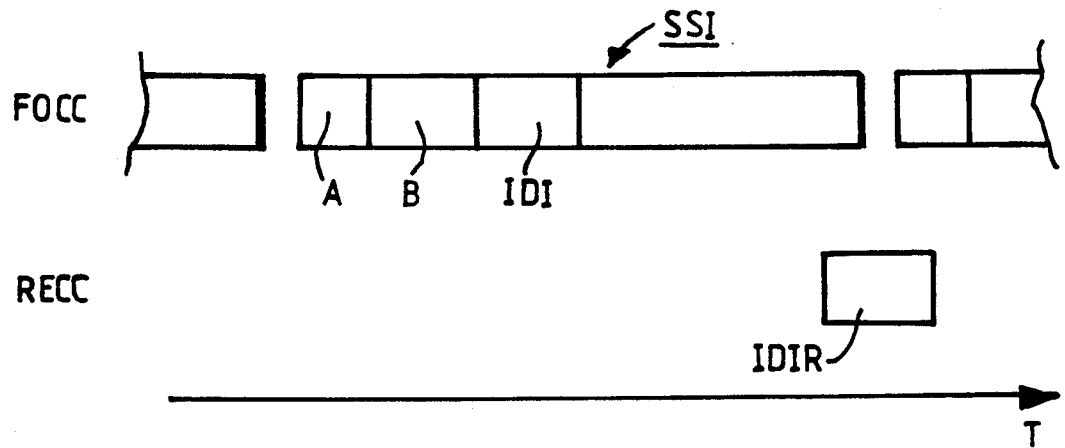
FIG. 2 illustrates schematically signal sequences for the internal mobile telephony system.
Figure 3:
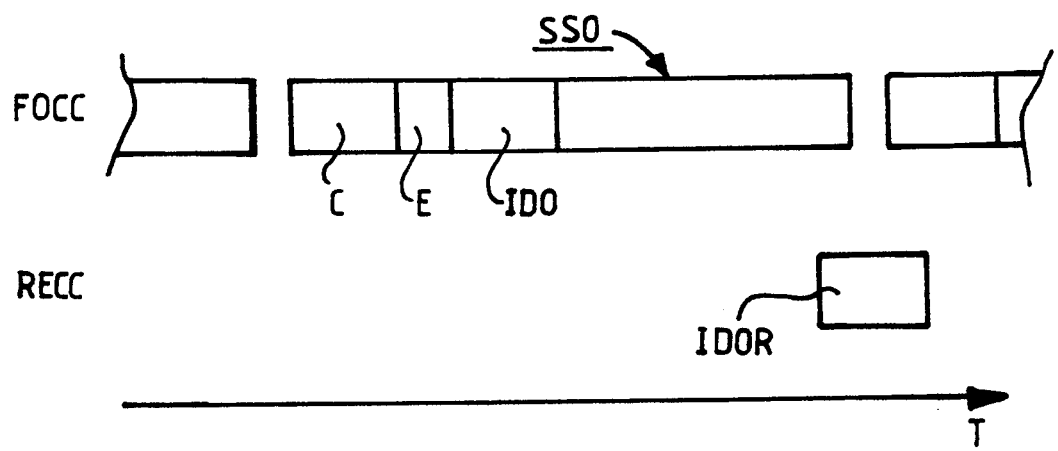
FIG. 3 illustrates schematically signal sequences for the external mobile telephony system.

The mobile station MSI is able to determine whether it belongs to the internal or to the external part-system in the following manner. The base stations BS1 of the internal part-system 6 transmit on the control channel FOCC signal sequences SSI which contain data words A and B intended for different purposes in a known manner, and an internal identification word IDI, as illustrated in FIG. 2. The reference sign T in FIG. 2 represents time. IDI is unique to the internal part-system. The base stations B1, B2 of the external part-system 7 transmit on the control channel FOCC signal sequences SSO which contain data words C and E intended for different purposes in a known manner, as shown in FIG. 3. The signal sequence SSO also includes an external identification word IDO which is unique to the external part-system. The mobile station MS constantly senses the control channels of the two part-systems. Immediately the signal strength of the identification word IDI in the internal part-system exceeds a threshhold value, the mobile station MSI will identify itself to the internal base stations BS1, i.e. the aforesaid logging-in process takes place. This is effected through a signal IDIR on the control channel RECC, as shown in FIG. 2. The mobile station registers the external identification word IDO and immediately the signal strength of the internal identification word IDI falls beneath the threshold value, the mobile station MSI will identify itself to one of the external base stations. This is effected through an external identification signal IDOR, as shown in FIG. 3. This enables the mobile station MSI itself to request for a call to be connected or to be connected to a calling subscriber via one of the indoor base stations BS1, provided that the mobile station MSI is located within the building 1 and the signal strength of IDI exceeds said threshold value. If the mobile station MSI leaves the building 1, the signal strength of the identification word IDI will fall beneath the threshold value, whereupon the mobile station MSI identifies itself to the external base station BS1. The mobile station MSI can herewith ask to be connected to make a call or to be connected to a call via the external base station BS1, in a corresponding manner.

In the case of the illustrated embodiment, the decision as to which of the two part-systems the mobile shall log into is decided on the signal strength of the identification word IDI in the control channel of the internal part-system. It is also possible to utilize the signal strength of the entire signal sequence SSI for the internal control channel or parts thereof, for instance the parts A and B. It is also possible to utilize, for instance, the bit error rate as a measurement of the signal quality on the channel, instead of a signal strength threshold value.

The invention has been described in the aforegoing with reference to an exemplifying embodiment in which the internal base stations BSI and the external base stations BS1, BS2 are connected directly to the mobile switching center MSC. The advantage with this embodiment is that an ongoing call connection to the mobile station MSI can be maintained in a relatively simple fashion when the mobile station moves between the internal and the external part-systems.

Figure 4:
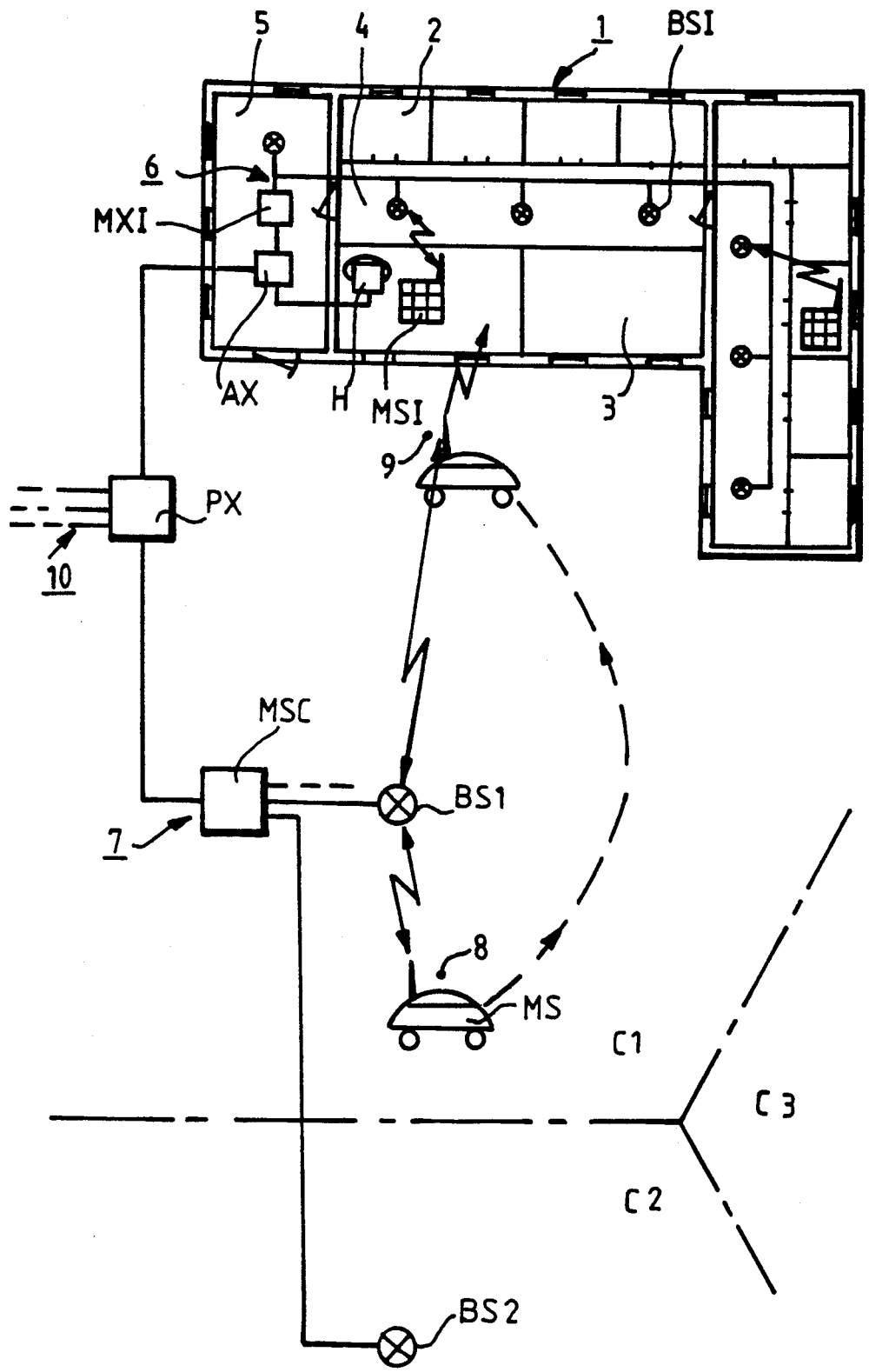
FIG. 4 illustrates an alternative embodiment of the building including the internal and the external mobile telephony system.

FIG. 4 illustrates an alternative embodiment of the invention which distinguishes from the embodiment illustrated in FIG. 1 insomuch as the two part-systems are mutually connected through a wire-bound public telephone network 10. The internal part-systems 6 is connected to a subscriber exchange AX which is connected by means of a wire to a public exchange PX in the public telephone network 10. The mobile switching center MSC is also connected to the public exchange PX by means of wires. Wire-bound telephone sets H may be connected to the subscriber exchange AX.

In the case of the described embodiment, the external part-system 7 has fixed channel assignment to the cells C1, C2 and C3. In accordance with the invention, however, the external part-system may also be adaptive and the base stations BS1 and BS2 may have access to all channels of the system. It is also conceivable to permanently assign the majority of the traffic channels in the external part-system to the external base stations in accordance with a predetermined frequency plan, although a smaller number of the traffic channels will be assigned adaptively, for instance in accordance with Swedish Patent No. 8801555-7. In the illustrated embodiment, the internal part-system 6 has access to all channels of the system. It lies within the scope of the invention to restrict this channel access.

I claim:

1. A mobile telephony system with a plurality of cells intended for indoor and outdoor subscriber use, and comprising an external part-system for outdoor use which includes external base stations of relatively high signal strength and connected directly to a mobile switching centre, and an internal part-system for indoor use and having internal base stations of relatively low signal strength which are connected to the mobile switching centre, wherein
   the two part-systems have traffic channels essentially for call transmissions and control channels essentially for assignment and change of the traffic channels;
   at least one of the traffic channels of the internal part-system has the same frequency as the traffic channels assigned to the base station of the external part-system cell in which the internal part-system is located;
   the inner part-system has adaptive channel assignment;
   an internal identification word which is unique to the internal part-system is transmitted from the internal base stations on the control channels in the internal part-system;
   an outer identification word which is unique to the external part-system is transmitted from the external base stations on the control channels in the external part-system;
   a mobile station detects a signal quality for the control channel of the internal part-system on which the internal identification word is transmitted;
   the mobile station transmits an internal identification signal to the internal base stations when the detected signal quality exceeds a desired quality measurement; and
   wherein the mobile station transmits an external identification signal to the external base stations when the detected signal quality is beneath the desired quality measurement.

2. A mobile telephony system according to claim 1, wherein the internal base stations are connected directly to the mobile switching centre MSC.

3. A mobile telephony system according to claim 1, wherein the internal base stations are connected to the mobile switching centre via a wire-bound telephone network.

4. A mobile telephony system according to claim 1, wherein the signal quality detected is a measurement of the signal strength of the control channel of said internal part-system.

5. A mobile telephony system according to claim 1, wherein the external part-system has fixed channel assignment.

6. A mobile telephony system according to claim 1, wherein the internal base stations are connected to a mobile switching centre via a subscriber exchange.

7. A mobile telephony system according to claim 1, wherein the frequency range of the traffic channels of the internal base stations are the same as the frequency range of traffic channels of the mobile telephony system.

8. A mobile telephony system according to claim 1, wherein the frequency range of the traffic and control channels of the internal base stations are the same as the frequency range of the traffic and control channels of the mobile telephony system.

* * * * *